United States Patent
Wermuth et al.

(10) Patent No.: US 8,347,849 B2
(45) Date of Patent: Jan. 8, 2013

(54) HIGH LOAD SI-HCCI TRANSITION BY SELECTIVE COMBUSTION MODE SWITCHING

(75) Inventors: Nicole Wermuth, Ann Arbor, MI (US); Paul M. Najt, Bloomfield Hills, MI (US); Hanho Yun, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 538 days.

(21) Appl. No.: 12/702,407

(22) Filed: Feb. 9, 2010

(65) Prior Publication Data

US 2010/0145594 A1 Jun. 10, 2010

Related U.S. Application Data

(63) Continuation-in-part of application No. 12/109,416, filed on Apr. 25, 2008, now Pat. No. 7,918,205.

(60) Provisional application No. 60/915,140, filed on May 1, 2007.

(51) Int. Cl.
*F02D 43/00* (2006.01)
*F02B 17/00* (2006.01)

(52) U.S. Cl. ............... 123/295; 701/102; 123/90.15

(58) Field of Classification Search .......... 123/295, 123/299, 305, 90.11, 90.15, 90.17, 443; 701/101, 701/102, 115

See application file for complete search history.

(56) References Cited

U.S. PATENT DOCUMENTS

| | | | |
|---|---|---|---|
| 6,553,958 B1 * | 4/2003 | Kolmanovsky et al. ...... 123/295 | |
| 6,609,493 B2 | 8/2003 | Yamaguchi et al. | |
| 6,619,255 B2 | 9/2003 | Urushihara et al. | |
| 6,640,754 B1 | 11/2003 | Iida | |
| 6,662,785 B1 | 12/2003 | Sloane et al. | |
| 7,093,568 B2 | 8/2006 | Yang | |
| 7,128,047 B2 | 10/2006 | Kuo et al. | |
| 7,152,559 B2 | 12/2006 | Kuo et al. | |
| 7,156,070 B2 | 1/2007 | Strom et al. | |
| 7,168,396 B1 | 1/2007 | Bulicz et al. | |
| 7,478,620 B2 | 1/2009 | Kuo et al. | |
| 7,748,354 B2 * | 7/2010 | Petridis ................. 123/90.15 |
| 7,918,205 B2 * | 4/2011 | Wermuth et al. ............ 123/295 |
| 2006/0196466 A1 | 9/2006 | Kuo et al. | |
| 2006/0243241 A1 | 11/2006 | Kuo et al. | |
| 2007/0272202 A1 | 11/2007 | Kuo et al. | |

FOREIGN PATENT DOCUMENTS

WO WO2006/032886 A2 3/2006

OTHER PUBLICATIONS

Herrmann, H., Control Concepts in Gasoline Engines with Homogeneous Charge Compression Combustion, Congress „Haus der Technik Controlled Auto Ignition, Oct. 20-21, 2005, Essen, Germany.

Hiraya, K., A Study on Gasoline Fueled Compression Ignition Engine ~ A Trial of Operation Region Expansion, SAE 2002-01-0416, Mar. 4-7, 2002, Detroit, Michigan.

(Continued)

*Primary Examiner* — Hieu T Vo

(57) ABSTRACT

A method for operating a direct-injection internal combustion engine includes unevenly distributing load among a plurality of cylinders by operating a portion of the plurality of cylinders in a spark ignition mode and the remaining portion of the plurality of cylinders in a homogeneous charge compression ignition mode.

19 Claims, 7 Drawing Sheets

OTHER PUBLICATIONS

Urushihara, T. Expansion of HCCI Operating Region by the Combination of Direct Fuel Injection, Negative Valve Overlap and Internal Fuel Reformation, SAE 2003-01-0749, Mar. 3-6, 2003, Detroit, Michigan.

Urushihara, T., A Study of a Gasoline-fueled Compression Ignition Engine ~ Expansion of HCCI Operation Range Using Si Combustion as a Trigger of Compression Ignition, SAE 2005-01-0180, Apr. 11-14, 2005, Detroit, Michigan.

Fuerhapter, A., The new AVL CSI Engine—HCCI Operation on a Multi Cylinder Gasoline Engine, SAE 2004-01-0551, Mar. 8-11, 2004, Detroit, Michigan.

Urushihara, T., A Study on Gasoline-Fueled Compression Ignition Engine—A Trial of Operation Region Expansion, SAE 2002-01-0416, Mar. 2002, Detroit, Michigan.

* cited by examiner

HIGH LOAD SI-HCCI TRANSITION BY SELECTIVE COMBUSTION MODE SWITCHING

CROSS REFERENCE TO RELATED APPLICATIONS

This application is a continuation-in part of U.S. application Ser. No. 12/109,416, filed on Apr. 25, 2008 now U.S. Pat. No. 7,918,205 B2, issued on 5 Apr. 2011, which claims the benefit of U.S. Provisional Application 60/915,140, filed on May 1, 2007. U.S. application Ser. No. 12/109,416 and U.S. Provisional Application 60/915,140 are incorporated herein by reference.

TECHNICAL FIELD

This invention pertains generally to internal combustion engine control systems.

BACKGROUND

The statements in this section merely provide background information related to the present disclosure and may not constitute prior art.

One engine system being developed for controlled auto-ignition combustion operation includes an internal combustion engine designed to operate under an Otto cycle. The engine, equipped with direct in-cylinder fuel-injection, operates in a controlled auto-ignition mode under specific engine operating conditions to achieve improved engine fuel efficiency. A spark ignition system is employed to supplement the auto-ignition combustion process during specific operating conditions. Such engines are referred to as Homogeneous Charge Compression Ignition (HCCI) engines.

An HCCI engine operating in HCCI combustion mode creates a charge mixture of combusted gases, air, and fuel in a combustion chamber, and auto-ignition is initiated simultaneously from many ignition sites within the charge mixture during a compression stroke, resulting in stable power output, high thermal efficiency and low emissions. The combustion is highly diluted and uniformly distributed throughout the charge mixture, resulting in low burnt gas temperature and NOx emissions typically substantially lower than NOx emissions of either a traditional spark ignition engine, or a traditional diesel engine.

An HCCI engine is distinguishable from a spark-ignition (SI) engine in that ignition of the charge mixture is caused by compression of the charge mixture under specific engine operating conditions. An HCCI engine transitions between HCCI combustion mode and spark-ignition combustion mode, depending upon predetermined operating conditions.

Applicants have successfully demonstrated smooth transition control between HCCI and SI/NTLC (SI with Non-Throttled Load Control) combustion modes utilizing dual independent, 2-step, cam profile switching mechanisms. In particular, transition from HCCI to SI/NTLC operation may be realized by cam phasing of low lift intake cams with Early Intake Valve Closing (EIVC) in conjunction with profile switching from low lift HCCI to high lift SI exhaust cam profiles. SI/NTLC engine operation is also possible using cam phasing of high lift SI intake cam with Late Intake Valve Closing (LIVC) if simultaneous switching of both intake and exhaust cam profiles between low lift HCCI and high lift SI cams is mandated.

However, depending on the lift and duration used for both the HCCI and SI cams and cam phaser authority and slew speed, smooth transition between HCCI and SI/NTLC combustion mode may be impossible beyond certain engine speed. In particular, a gap exists between the highest load reachable with HCCI operation and the lowest load reachable with SI/NTLC operation above a certain engine speed. SI combustion stability limits result from excessive charge dilution with the prescribed high lift cams. Applicants have successfully demonstrated that selective cylinder deactivation by fuel cutoff may be employed to extend the engine low load operating limit in SI combustion mode by allowing stable operation of the active cylinders. Alternatively, it is believed that more complex cam profile switching mechanisms (e.g. three-step cam profiles) or continuously variable valvetrains could successfully be employed to extend both the high load HCCI and low load SI operating limits and close the gap between HCCI and SI operations (e.g. through intermediate lift and duration). However, an alternative utilizing the less complex 2-step, cam profile switching mechanisms and without additional cylinder deactivation hardware is desirable.

SUMMARY

A direct-injection internal combustion engine has a plurality of cylinders each individually selectively operable in a homogeneous charge compression ignition mode and a spark ignition mode. A method for operating the engine includes monitoring a speed of the engine, monitoring a load of the engine, determining an average load per cylinder based upon the load of the engine, determining if engine operation based upon the engine speed and the average load per cylinder is within an operational gap between the homogeneous charge compression ignition mode and the spark ignition mode wherein both combustion modes fail threshold comparisons, and unevenly distributing load among the plurality of cylinders by operating a portion of the plurality of cylinders in the spark ignition mode and the remaining portion of the plurality of cylinders in the homogeneous charge compression ignition mode.

BRIEF DESCRIPTION OF THE DRAWINGS

One or more embodiments will now be described, by way of example, with reference to the accompanying drawings, in which.

DETAILED DESCRIPTION

Figure 1:
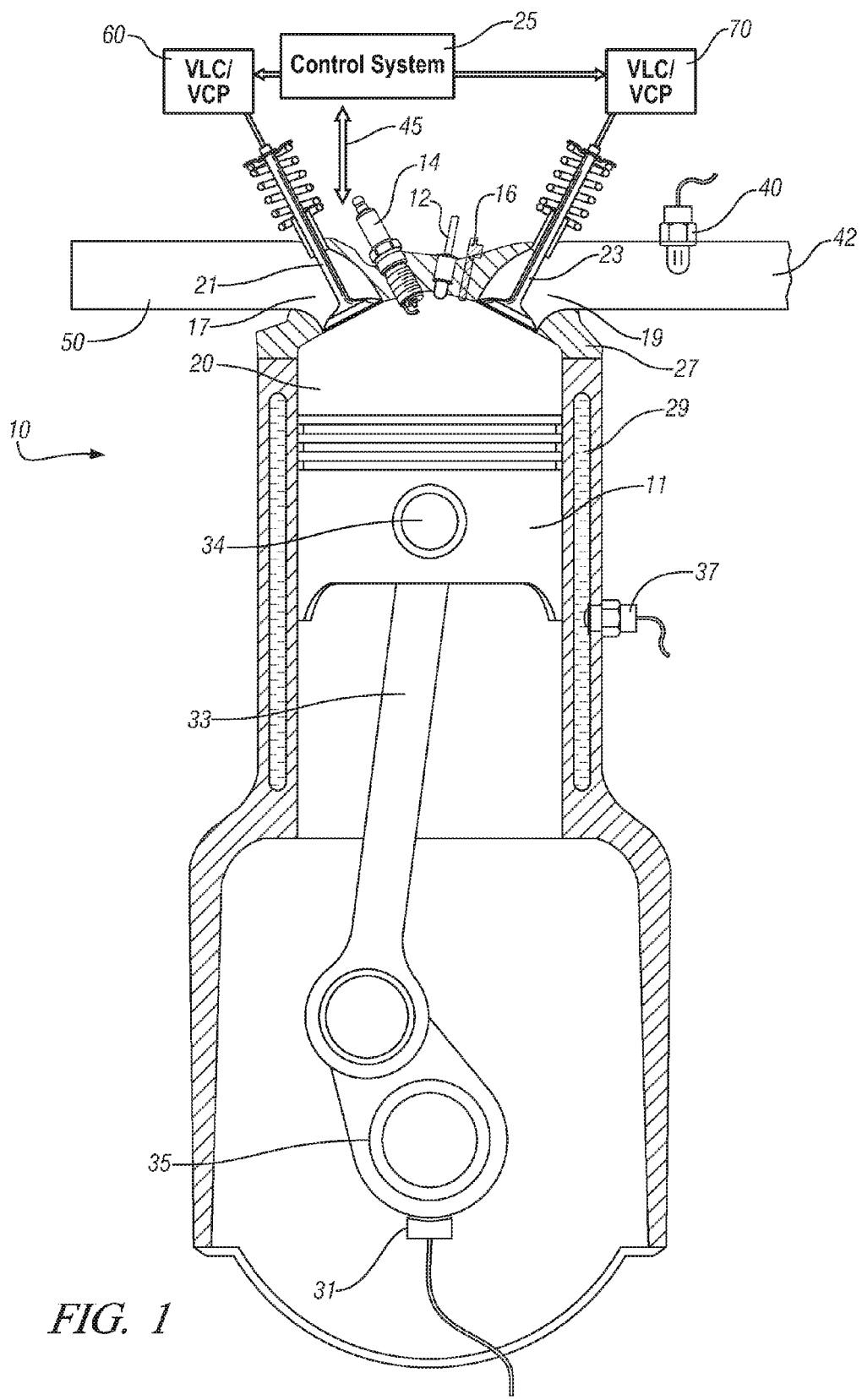
FIG. 1 is a schematic illustration of an internal combustion engine, in accordance with the present disclosure.

Referring now to the drawings, wherein the showings are for the purpose of illustrating certain exemplary embodiments only and not for the purpose of limiting the same, FIG. 1 shows a schematic of an internal combustion engine 10 and control system 25 which has been constructed in accordance with an embodiment of the present invention. The embodiment as shown is applied as part of an overall control scheme to operate an exemplary multi-cylinder dual overhead cam, spark ignition, direct-injection, gasoline, four-stroke internal combustion engine 10 adapted to operate under a controlled auto-ignition process, also referred to as homogenous-charge, compression-ignition (HCCI) mode.

the exemplary engine 10 includes a cast-metal engine block with a plurality of cylinders formed therein, one of which is shown, and an engine head 27. Each cylinder includes a closed-end cylinder having a moveable, reciprocating piston 11 inserted therein. A variable volume combustion chamber 20 is formed in each cylinder, and is defined by walls of the cylinder, the moveable piston 11, and the head 27. The engine block preferably includes coolant passages 29 through which engine coolant fluid passes. A coolant temperature sensor 37, operable to monitor temperature of the coolant fluid, is located at an appropriate location, and provides a parametric signal input to the control system 25 useable to control the engine 10. The engine 10 preferably includes known systems including an external exhaust gas recirculation (EGR) valve and an intake air throttle valve.

Each moveable piston 11 includes a device designed in accordance with known piston forming methods, and includes a top and a body which conforms substantially to the cylinder in which it operates. The piston has top or crown area that is exposed in the combustion chamber. Each piston is connected via a pin 34 and connecting rod 33 to a crankshaft 35. The crankshaft 35 is rotatably attached to the engine block at a main bearing area near a bottom portion of the engine block, such that the crankshaft 35 is able to rotate around an axis that is perpendicular to a longitudinal axis defined by each cylinder. A crank sensor 31 is placed in an appropriate location, operable to generate a signal that is useable by the controller 25 to measure crank angle, and which is translatable to provide measures of crankshaft rotation, speed, and acceleration that are useable in various control schemes. During operation of the engine 10, each piston 11 moves up and down in the cylinder in a reciprocating fashion due to connection to and rotation of the crankshaft 35, and the combustion process. The rotation action of the crankshaft 35 effects translation of linear force exerted on each piston 11 during combustion to an angular torque output from the crankshaft 35, which can be transmitted to another device, e.g. a vehicle driveline.

The engine head 27 includes a cast-metal device having one or more intake ports 17 and one or more exhaust ports 19 which flow to the combustion chamber 20. An intake port throttle may also be employed usefully in certain preferred embodiments as described further herein below. The intake port 17 supplies air to the combustion chamber 20. Combusted (burned) gases flow from the combustion chamber 20 via exhaust port 19. Flow of air through each intake port 17 is controlled by actuation of one or more intake valves (IV) 21. Flow of combusted gases through each exhaust port 19 is controlled by actuation of one or more exhaust valves (EV) 23.

The intake and exhaust valves 21, 23 each have a head portion that includes a top portion that is exposed to the combustion chamber. Each of the valves 21, 23 has a stem that is connected to a valve actuation device. A valve actuation device, depicted as 60, is operative to control opening and closing of each of the intake valves 21, and a second valve actuation device 70 operative to control opening and closing of each of the exhaust valves 23. Each of the valve actuation devices 60, 70 includes a device signally connected to the control system 25 and operative to control timing, duration, and magnitude of opening and closing of each valve, either in concert or individually. The first embodiment of the exemplary engine 10 includes a dual overhead cam system which has variable lift control (VLC) and variable cam phasing (VCP). The VCP device is operative to control timing of opening or closing of each intake valve 21 and each exhaust valve 23 relative to rotational position of the crankshaft 35 and opens each valve 21, 23 for a fixed crank angle duration. The exemplary VLC device is operative to control magnitude of valve lift to one of two positions, a low lift position to a magnitude of 3-5 mm lift for an open duration of 120-150 crank angle degrees, and a high lift position to a magnitude of 9-12 mm lift for an open duration of 220-260 crank angle degrees. Individual valve actuation devices 60, 70 can serve the same function to the same effect. The valve actuation devices 60, 70 are preferably controlled by the control system 25 according to predetermined control schemes. A specific aspect of a control scheme to control opening and closing of the valves 21, 23 is described herein.

Air is inlet to the intake port 17 through an intake manifold runner 50, which receives filtered air passing through a known air metering device and a throttle device. Exhaust gas passes from the exhaust port 19 to an exhaust manifold 42, which includes exhaust gas sensors 40 operative to monitor constituents of the exhaust gas feedstream, and determine parameters associated therewith. The exhaust gas sensor 40 can comprise any one of several known sensing devices operative to provide parametric values for the exhaust gas feedstream, including air/fuel ratio, or measurement of exhaust gas constituents, e.g. NOx, CO, HC, and others. The system may include an in-cylinder sensor 16 from monitoring combustion pressures. The aforementioned sensors and metering devices each provide a signal as a parametric input to the control system 25. These parametric inputs can be used by the control system 25 to determine combustion performance measurements.

The control system 25 preferably includes a subset of an overall control architecture operable to provide coordinated system control of the engine 10 and other systems. In overall operation, the control system 25 is operable to synthesize operator inputs, ambient conditions, engine operating parameters, and combustion performance measurements, and execute algorithms to control various actuators to achieve targets for control parameters, including such parameters as fuel economy, emissions, performance, and, driveability. The control system 25 is operably connected to a plurality of devices through which an operator typically controls or directs operation of the engine 10. Exemplary operator inputs include an accelerator pedal, a brake pedal, transmission gear selector, and, vehicle speed cruise control when the engine 10 is employed in a vehicle. The control system 25 may communicate with other controllers, sensors, and actuators via a local area network (LAN) bus which preferably allows for structured communication of control parameters and commands between various controllers.

The control system 25 is operably connected to the engine 10, and functions to acquire parametric data from sensors, and control a variety of actuators, respectively, of the engine 10 over a plurality of discrete lines collectively shown as aggregate line 45. The control system 25 receives an engine torque command, and generates a desired torque output, based upon the operator inputs. Engine operating parameters that are typically sensed by control system 25 using the aforementioned sensors include engine coolant temperature, crankshaft rotational speed (RPM) and position, manifold absolute pressure, ambient air flow and temperature, and, ambient air pressure. Combustion performance measurements typically comprise measured and inferred combustion parameters, including air/fuel ratio, location of peak combustion pressure, amongst others.

Actuators controlled by the control system 25 include: fuel injectors 12; the VCP/VLC valve actuation devices 60, 70; spark plug 14 operably connected to ignition modules for controlling spark dwell and timing; exhaust gas recirculation (EGR) valve, and, electronic throttle control module. Fuel injector 12 is preferably operable to inject fuel directly into each combustion chamber 20. Specific details of exemplary direct injection fuel injectors are known and not detailed herein. Spark plug 14 is employed by the control system 25 to enhance ignition timing control of the exemplary engine 10 across portions of the engine speed and load operating range. When the exemplary engine 10 is operated in the HCCI mode, the engine 10 does not utilize an energized spark plug. It has proven desirable to employ spark ignition to complement the HCCI mode under certain conditions, including, e.g. during cold start, at low load operating conditions near a low-load limit, and to prevent fouling. Also, it has proven preferable to employ spark ignition at a high load operation limit in the HCCI mode, and at high speed/load operating conditions under throttled or un-throttled spark-ignition operation.

The control system 25 preferably includes a cylinder deactivation system operative to selectively deactivate a subset of the total number of cylinders. A cylinder deactivation mode in this embodiment includes discontinuing fuel flow to the deactivated cylinders during the period of deactivation. The cylinder deactivation mode may include disabling opening of the intake and/or exhaust valves 21, 23 concurrent with discontinuing fuel flow to specific cylinders. The control system 25 meets the engine torque command by increasing torque output from the activated cylinders during the period of time when the cylinder deactivation mode is enabled.

The control system 25 preferably includes a general-purpose digital computer generally including a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. The control system 25 has a set of control algorithms, including resident program instructions and calibrations stored in ROM and executed to provide the respective functions of each computer.

Algorithms for the control system 25 are typically executed during preset loop cycles such that each algorithm is executed at least once each loop cycle. Algorithms stored in the non-volatile memory devices are executed by the central processing unit and are operable to monitor inputs from the sensing devices and execute control and diagnostic routines to control operation of the engine 10, using preset calibrations. Loop cycles are typically executed at regular intervals, for example each 3.125, 6.25, 12.5, 25 and 100 milliseconds during ongoing engine operation. Alternatively, algorithms may be executed in response to occurrence of an event.

Figure 2:
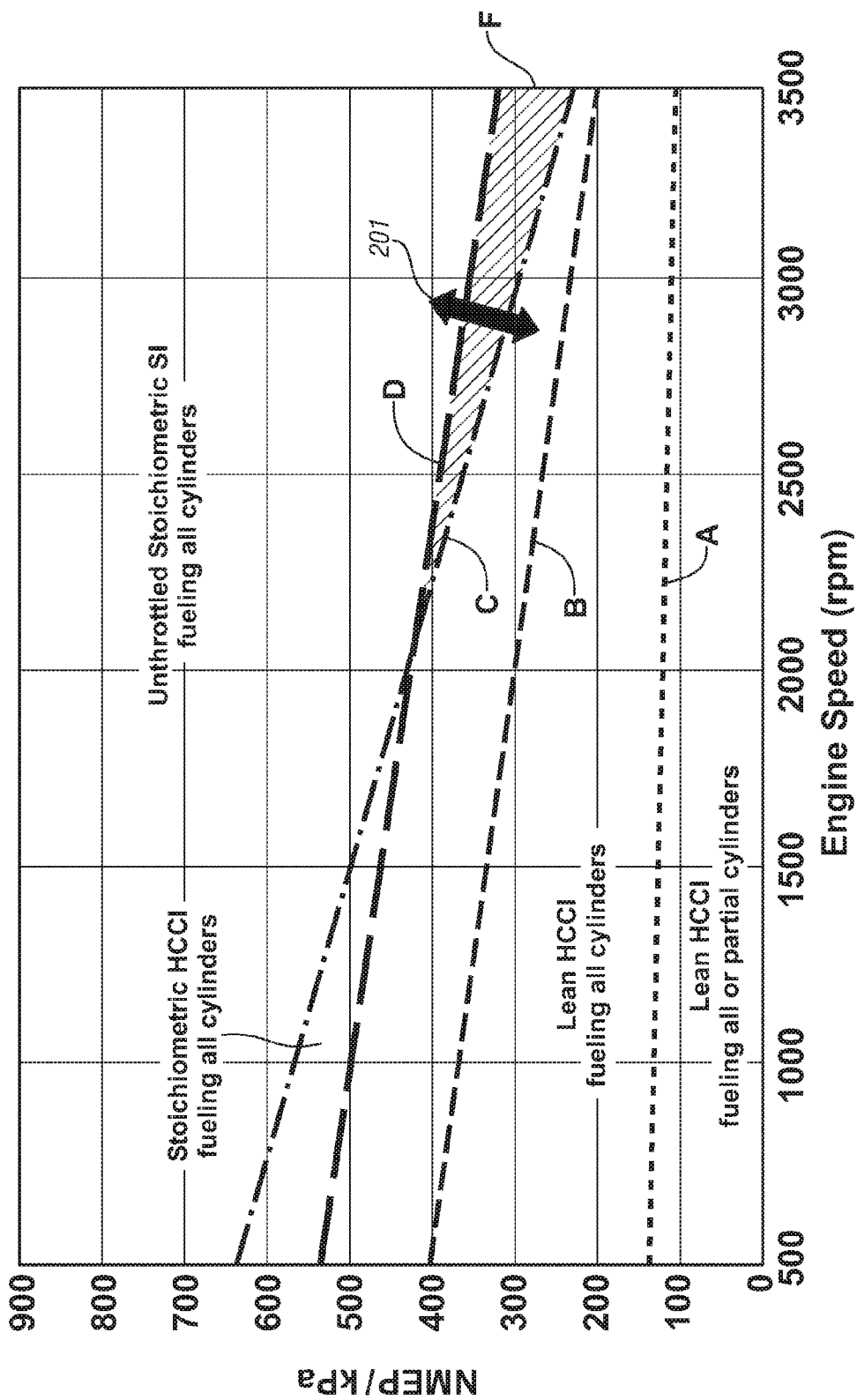
FIG. 2 is a graphic depiction of various operating regions of an exemplary direct-injection internal combustion engine, in accordance with the present disclosure.

FIG. 2 shows a graphic depiction of areas of engine operation under various conditions is shown for the exemplary dual overhead cam engine 10 with variable valve actuation system having dual cam phasers and 2-step lifter system. Load can be determined according a number of known methods in the art including through measurement of fuel flow and/or airflow depending upon the combustion mode being employed. Additionally, engine load and speed can be estimated through a transition based upon an operator torque demand input, for example, through a pedal position. The exemplary engine 10 is operative in HCCI mode, over a range of engine speeds, in revolutions per minute (rpm) and load, in net mean effective pressure units of kilopascals (NMEP (kPa)). Line A depicts a lower limit for operating the engine 10 in lean HCCI mode, below which one or more of the cylinders are unfueled, which is a low speed/low load operating condition. In such an exemplary configuration, a determination is made regarding the load on the engine 10 and/or the load on individual cylinders and engine speed, and an algorithm cuts fuels to and implements certain valve strategies in order to optimally deactivate selected cylinders. By only utilizing a portion of the cylinders, the load under which the remaining operating cylinders operate is increased, enabling HCCI operation at a lower overall engine load. Under this configuration, engine load is continued to be monitored, and cylinders are reactivated as appropriate depending upon engine load and speed. Line B depicts an upper limit for operating the engine 10 in lean HCCI mode with all cylinders fueled. Line C depicts an upper limit for operating the engine 10 in a stoichiometric HCCI mode with all cylinders fueled. Line D depicts a lower limit for operating the engine 10 in an unthrottled stoichiometric SI (SI-NTLC) mode with all cylinders fueled. Line C may be determined based upon engine combustion generated noise (ringing). Line D may be determined based upon engine combustion stability as measured by coefficient of variability of mean effective pressure (COV-IMEP). There can be an upper limit for operating the engine 10 in the SI-NTLC mode, above which the engine 10 is preferably operated in a throttled stoichiometric SI mode. The shaded area depicted by the letter F depicts an area in which it is undesirable to operate the engine 10 in either of the stoichiometric HCCI mode or unthrottled stoichiometric SI (SI-NTLC) mode on all cylinders. The unthrottled stoichiometric SI mode includes controlling the cam phasers to adjust valve opening/closing timings such that the amount of air induction is controlled without throttling in the air intake system. The shaded area depicted by the letter F describes an all cylinders fueled operational gap between the stoichiometric HCCI and unthrottled stoichiometric SI combustion modes wherein both combustion modes would fail respective load threshold (Lines C and D) comparisons. Stoichiometric HCCI mode operation within such an operational gap would be at loads above the predetermined load threshold (Line C) which, as described above, would result in undesirable combustion noise, and at loads below the predetermined load threshold (Line D) which, as described above, would result in undesirable combustion stability. Line D depicts a lower limit for operating the engine 10 in an unthrottled stoichiometric SI mode with all cylinders fueled.

Depending on specific valve lift and duration employed for the intake and exhaust camshafts of the exemplary HCCI engine 10, there is a need for a smooth transition 201 between the stoichiometric HCCI mode and the unthrottled stoichiometric SI mode when operating the engine 10 around and through the engine speed range of 3000 rpm, principally in the region identified on FIG. 2 by the letter F. In particular, a gap exists between the highest load reachable in the stoichiometric HCCI mode and the lowest load reachable with unthrottled stoichiometric SI mode above an engine speed of about 2000 rpm, e.g., FIG. 2, if a 2-step valve lift system is used. The highest load attainable in the stoichiometric HCCI mode is limited by ringing (combustion generated noise). The lowest attainable load with SI operation is limited by combustion stability (COV−IMEP=3%). The HCCI ringing limit results from an inability to induct sufficient charge dilution with the prescribed low lift cams. The SI limit results from excessive charge dilution with the prescribed high lift cams.

Figure 3:
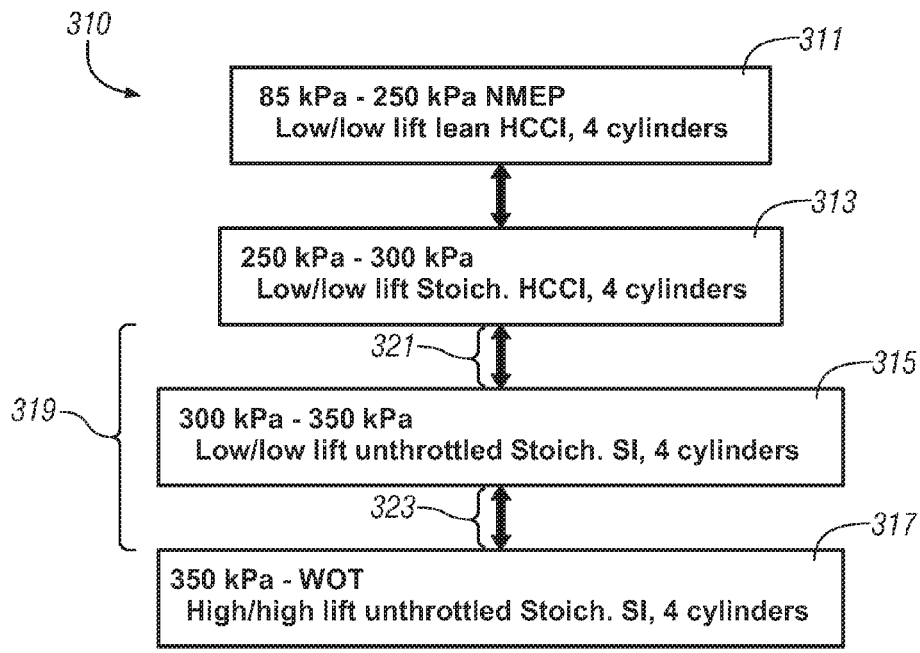
FIG. 3 is a first exemplary operation for effecting smooth transitions between HCCI and SI modes, in accordance with the present disclosure.
Figure 4:
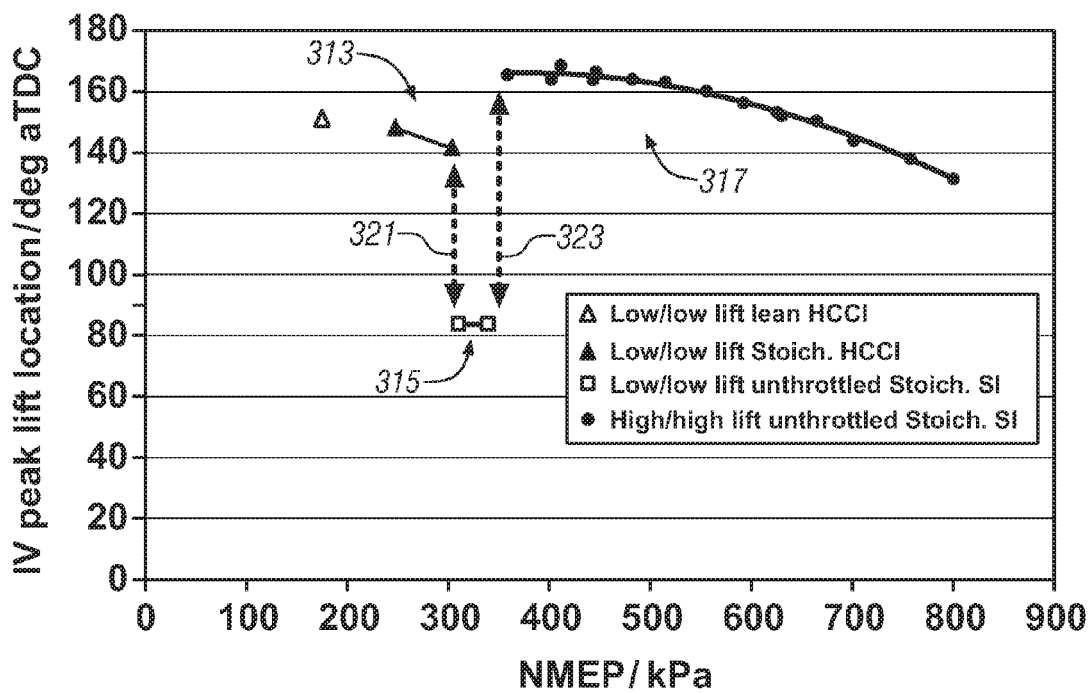
FIG. 4 is a data graph representing exemplary peak intake valve lift across transitions between HCCI and SI modes, in accordance with the first exemplary operation of FIG. 3.
Figure 5:
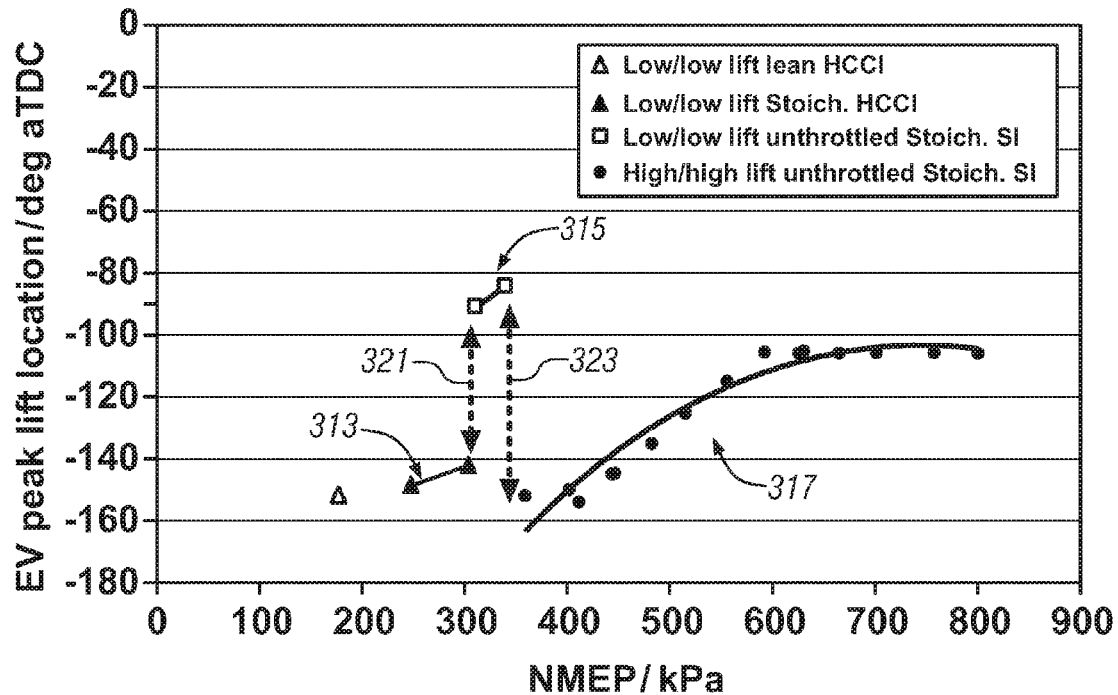
FIG. 5 is a data graph representing exemplary peak exhaust valve lift across transitions between HCCI and SI modes, in accordance with the first exemplary operation of FIG. 3.

Therefore, in order to bridge the gap between HCCI operation with the prescribed low lift cams and SI operation with the prescribed high lift cams using a 2-step CPS mechanism, and with further reference now to FIGS. 3-5, in accordance with one embodiment, operated in at an exemplary engine speed of 3000 rpm, transition is controlled between lean or stoichiometric HCCI operation (low EV and low IV lift) 311, 313 to un-throttled stoichiometric SI operation (low EV and low IV lift) 315 and to un-throttled stoichiometric SI operation (high EV and high IV lift) 317. FIGS. 4 and 5 show the peak lift location of the intake and exhaust valves, respectively, at different engine load conditions. Together, they illustrate one embodiment in an engine having multiple intake ports per cylinder, at least one of which has an associated intake port throttle which is actuated during un-throttled stoichiometric SI operation (low EV and low IV lift) 315.

When transitioning from the stoichiometric HCCI operation (low EV and low IV lift) 313 to the un-throttled stoichiometric SI operation (low EV and low IV lift) 315 the peak lift location of the opened intake valve needs to be changed by more than 50 CAD to reduce the airflow through the intake valve sufficiently to enable un-throttled stoichiometric engine operation. If this strategy is used in a transient engine operation, a fast cam phasing/valve timing mechanism is necessary. For the transition from un-throttled stoichiometric SI operation (low EV and low IV lift) 315 to un-throttled stoichiometric SI operation (high EV and high IV lift) 317, the peak intake valve lift location needs to be changed by around 80 CAD in addition to an increase in peak valve lift. The intake port throttle allows for effectively restricting airflow through the associated intake valve regardless of the valve's actuation and allows for smaller phase changes of the intake cams to effect equivalent effects. Therefore, reduced authority range cam phasing hardware may be employed when coupled with intake port throttling and smaller dynamic range and slew rates of the cam phasing hardware may be required to effect an equivalent intake air control. In other words and as illustrated in FIG. 4, whereas a dual intake port/valve with one intake port throttle complement required a cam phase change of substantially 60 degrees to effect transition from stoichiometric HCCI operation (low EV and low IV lift) 313 to un-throttled stoichiometric SI operation (low EV and low IV lift) 315, such a dual intake valve arrangement without an intake port throttle would require a larger phase change to effect an acceptable transition to and operation within the un-throttled stoichiometric SI operation (low EV and low IV lift) 315. And, given that the un-throttled stoichiometric SI operation (high EV and high IV lift) 317 exhibits even greater crank angle separation between the EV and the IV peak lifts than does the stoichiometric HCCI operation (low EV and low IV lift) 313 at least at the respective transitions (321, 323), the benefits to transition from un-throttled stoichiometric SI operation (low EV and low IV lift) 315 to un-throttled stoichiometric SI operation (high EV and high IV lift) 317 of smaller cam phase changes afforded by multiple intake ports per cylinder, at least one of which has an associated intake port throttle which is actuated during un-throttled stoichiometric SI operation (low EV and low IV lift) 315 are even more acute.

When transitioning from the stoichiometric HCCI operation (low EV and low IV lift) 313 to the un-throttled stoichiometric SI operation (low EV and low IV lift) 315 the peak lift location of the exhaust valve(s) is changed by more than 40 CAD to reduce the internal residual level enough to facilitate flame propagation. For the transition from un-throttled stoichiometric SI operation (low EV and low IV lift) 315 to un-throttled stoichiometric SI operation (high EV and high IV lift) 317 the peak exhaust valve lift location is changed by around 70 CAD in addition to an increase in peak valve lift.

If two intake valves instead of one are effective (i.e. no intake port throttling) or if a different peak valve lift or opening durations are used, the shown curves for the peak lift location of intake and exhaust valves will shift but the presented trends will stay the same.

Figure 6:
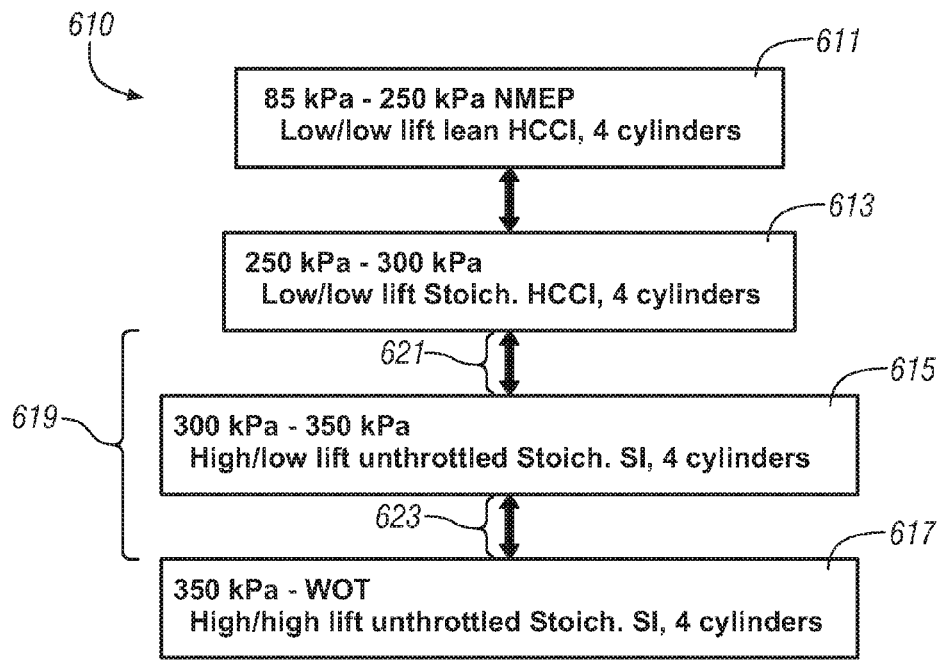
FIG. 6 is a second exemplary operation for effecting smooth transitions between HCCI and SI modes, in accordance with the present disclosure.
Figure 7:
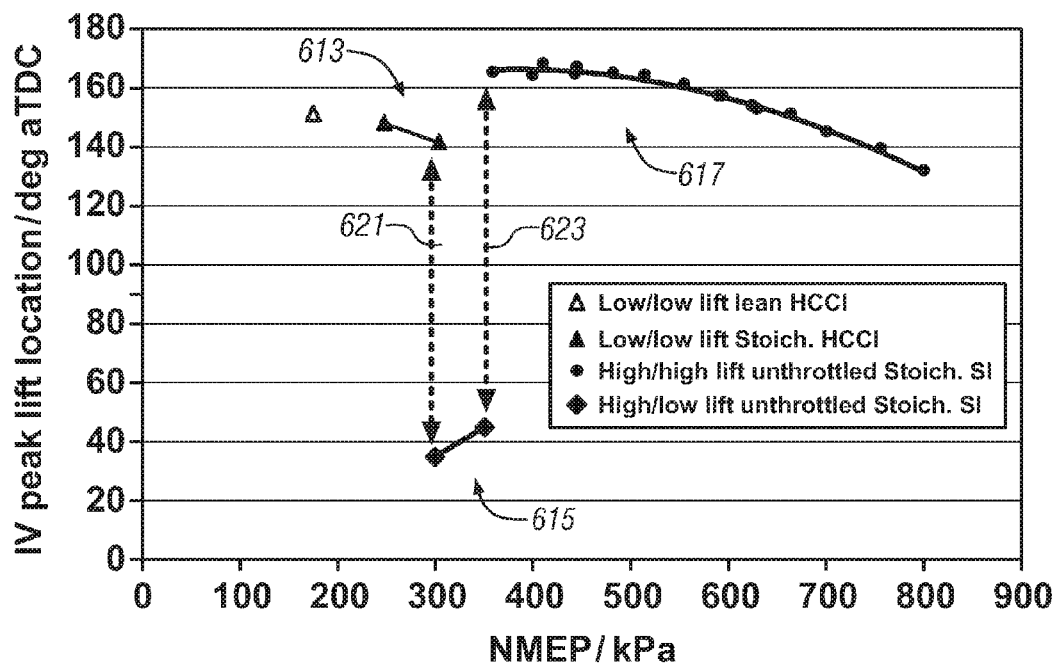
FIG. 7 is a data graph representing exemplary peak intake valve lift across transitions between HCCI and SI modes, in accordance with the second exemplary operation of FIG. 6.
Figure 8:
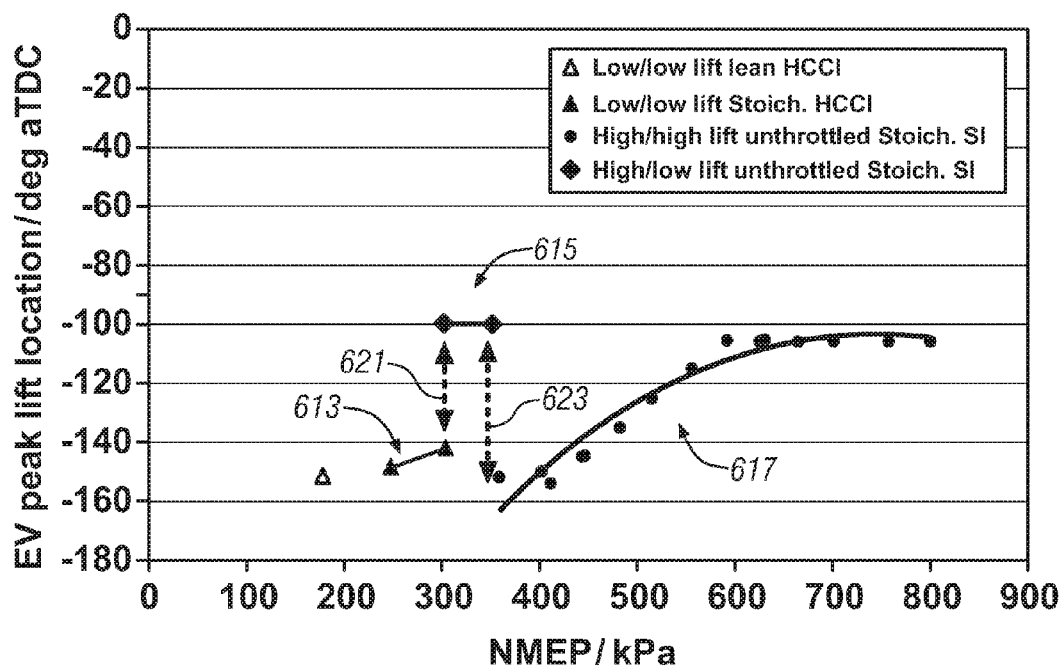
FIG. 8 is a data graph representing exemplary peak exhaust valve lift across transitions between HCCI and SI modes, in accordance with the second exemplary operation of FIG. 6.

In accordance with another embodiment, in order to bridge the gap between HCCI operation with the prescribed low lift cams and SI operation with the prescribed high lift cams using a 2-step CPS mechanism, and with further reference now to FIGS. 6-8, the present exemplary embodiment operated in at an exemplary engine speed of 3000 rpm, transition is controlled between lean or stoichiometric HCCI operation (low EV and low IV lift) 611, 613 to un-throttled stoichiometric SI operation (high EV and low IV lift) 615 and to un-throttled stoichiometric SI operation (high EV and high IV lift) 617. FIGS. 7 and 8 show the peak lift location of the intake and exhaust valves, respectively, at different engine load conditions. Together, they illustrate an embodiment in an engine without intake port throttling during un-throttled stoichiometric SI operation (high EV and low IV lift) 615.

When transitioning from the stoichiometric HCCI operation (low EV and low IV lift) 613 to the un-throttled stoichiometric SI operation (high EV and low IV lift) 615 the peak lift location of the opened intake valve needs to be changed by about 100 CAD to reduce the airflow through the intake valves sufficiently to enable un-throttled stoichiometric engine operation. If this strategy is used in a transient engine operation, a fast cam phasing/valve timing mechanism is necessary. For the transition from un-throttled stoichiometric SI operation (high EV and low IV lift) 615 to un-throttled stoichiometric SI operation (high EV and high IV lift) 617, the peak intake valve lift location needs to be changed by more than 100 CAD in addition to an increase in peak valve lift.

Inclusion of an intake port throttle would allow for effectively restricting airflow through the associated intake valve regardless of the valve's actuation and would enable use of smaller phase changes of the intake cams to effect equivalent effects. Therefore, reduced authority range cam phasing hardware could be employed when coupled with intake port throttling and smaller dynamic range and slew rates of the cam phasing hardware advantageously could be employed to effect an equivalent intake air control. In other words and as illustrated in FIG. 7, whereas a dual intake complement without intake port throttling required a cam phase change of substantially 100 CAD to effect transition from stoichiometric HCCI operation (low EV and low IV lift) 613 to un-throttled stoichiometric SI operation (low EV and low IV lift) 615, such a dual intake valve arrangement with an intake port throttle would require a smaller phase change to effect an acceptable transition to and operation within the un-throttled stoichiometric SI operation (low EV and low IV lift) 615. And, given that the un-throttled stoichiometric SI operation (high EV and high IV lift) 617 exhibits even greater crank angle separation between the EV and the IV peak lifts than does the stoichiometric HCCI operation (low EV and low IV lift) 613 at least at the respective transitions (621, 623), the benefits to transition from un-throttled stoichiometric SI operation (low EV and low EV lift) 315 to un-throttled stoichiometric SI operation (high IV and high IV lift) 617 of smaller cam phase changes afforded by multiple intake ports per cylinder, at least one of which has an associated intake port throttle which is actuated during un-throttled stoichiometric SI operation (low EV and low IV lift) 615 are even more acute.

When transitioning from the stoichiometric HCCI operation (low EV and low IV lift) 613 to the un-throttled stoichiometric SI operation (high EV and low IV lift) 615 the peak lift location of the exhaust valve(s) is changed by about 40 CAD to reduce the internal residual level enough to facilitate flame propagation. Additionally, this phase change is accompanied by a change in exhaust valve lift from low to high. For the transition from un-throttled stoichiometric SI operation (high EV and low IV lift) 615 to un-throttled stoichiometric SI operation (high EV and high IV lift) 617 the peak exhaust valve lift location is changed by around 50 CAD.

If one intake valve instead of two are effective (i.e. intake port throttling) or if a different peak valve lift or opening durations are used, the shown curves for the peak lift location of intake and exhaust valves will shift but the presented trends will stay the same.

If different peak valve lift and/or opening duration are used for both high and low lift cams, the peak lift locations of intake and exhaust valves presented in FIGS. 4, 5, 7 and 8 will vary but the trends and employed transition strategies remain the same.

As described above, in exemplary engine configurations using a dual dependent 2-step, cam profile switching mechanism that allows switching for individual cylinders, a gap can be defined at higher engine loads between HCCI operation, limited by an HCCI ringing limit or ringing threshold, and SI operation, the SI limit or stability threshold resulting from excessive charge dilution with the prescribed high lift cams. The HCCI ringing limit results from an inability to induct sufficient charge dilution with the prescribed low lift cams. Another method to bridge such an exemplary gap between HCCI operation with the prescribed low lift cams and SI operation with the prescribed high lift cams using a 2-step CPS mechanism is disclosed. The gap depicted in FIG. 2 describes a region that cylinders of the vehicle must operate in to deliver an engine output load to meet the demanded load required of the engine through a range of conditions, assuming the engine output load required is simply divided between cylinders evenly or according to an average load per cylinder. However, if the engine output load required can be divided unequally among the cylinders, any of the cylinders operating within the gap can be avoided. A method is disclosed to utilize a combined mode, utilizing a portion of cylinders in an engine in a stoichiometric HCCI mode at a lower load and a portion of cylinders in the engine in an unthrottled stoichiometric SI mode at a higher load, with the net output of the engine satisfying the engine output load required. While the above engine configuration is given as an example, it will be appreciated that the method being disclosed can be applied to other similar engine configurations.

FIG. 2 describes the region identified by the letter F or a gap between operating modes wherein threshold conditions for each of the modes makes operation in the gap unfavorable. It should be appreciated that methods described herein can react to occurrence of operation within this gap, but a preferred embodiment judges a future state of the engine according to methods known in the art, predicts imminent transition into the gap, and takes corrective actions according to the methods herein to avoid any cylinders of the engine operating within the gap. The future state of the engine, including a future speed and future load of the engine can be predicted or estimated, for example, according to factors including a current engine speed, a current transmission gear, and an output torque request by the operator determined for example by a pedal position (output torque being described as the torque at the output of the transmission to the drivetrain). In this way, unfavorable combustion stability, ringing, or other adverse effects are not incurred by operation of the cylinders. Speed and load throughout the disclosure should be understood to include either current engine speed and load or future engine speed and load.

Figure 9:
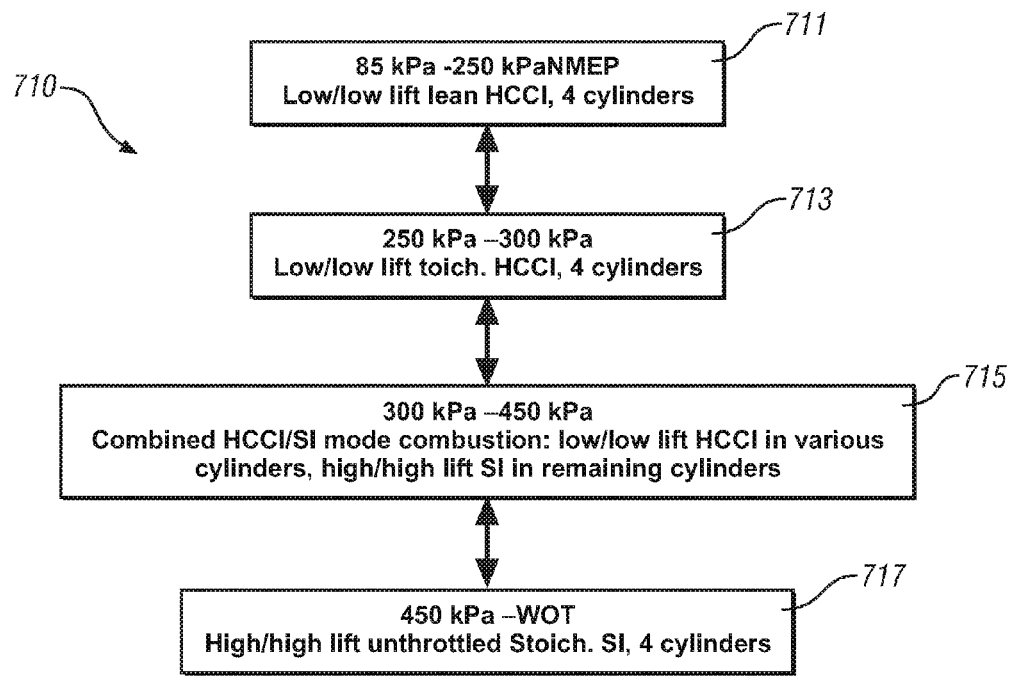
FIG. 9 is a first exemplary operation for effecting smooth transitions between HCCI and SI modes, in accordance with the present disclosure.
Figure 10:
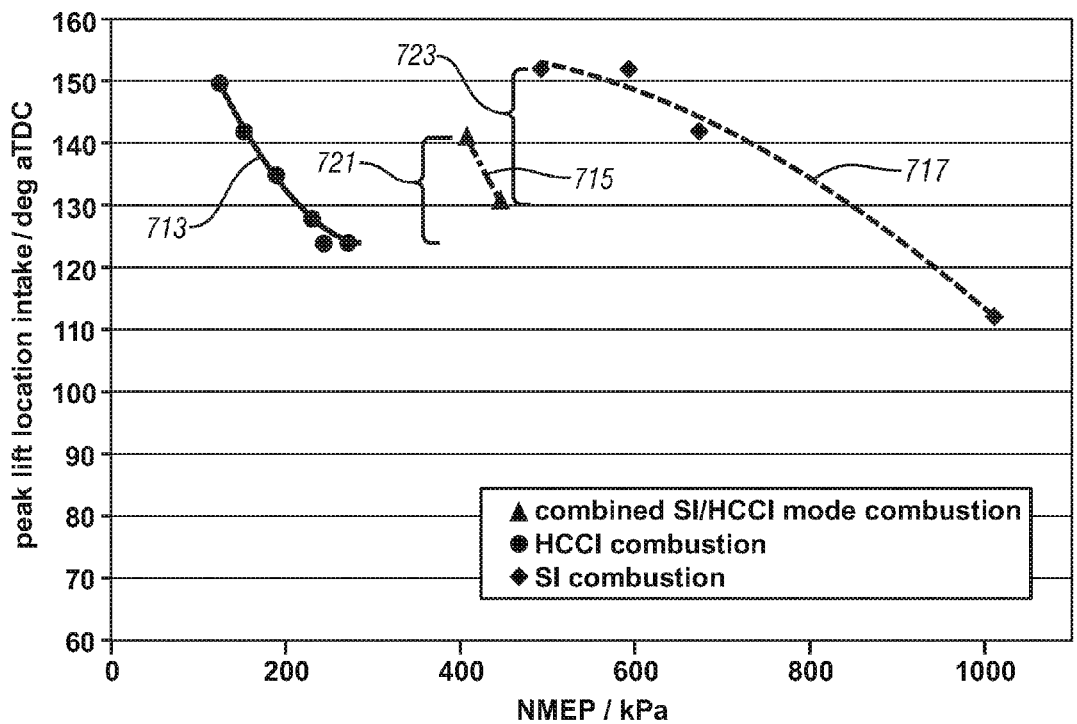
FIG. 10 is a data graph representing exemplary peak intake valve lift across transitions between HCCI and SI modes, in accordance with the exemplary operation of FIG. 9.
Figure 11:
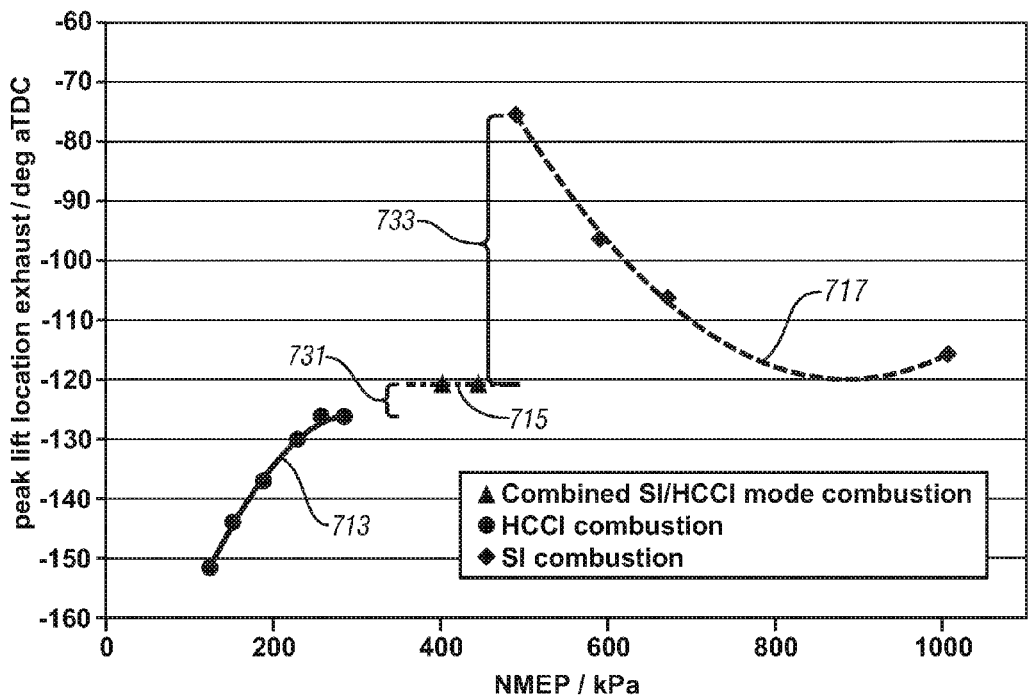
FIG. 11 is a data graph representing exemplary peak exhaust valve lift across transitions between HCCI and SI modes in accordance with the exemplary operation of FIG. 9.

With further reference now to FIGS. 9-12, operated at an exemplary engine speed of 3000 rpm, transition is controlled between lean or stoichiometric HCCI operation (low EV and low IV lift) 711, 713 to a combined HCCI (low EV and low IV lift) and SI (high EV and high IV lift) 715 operation and to un-throttled stoichiometric SI operation (high EV and high IV lift) 717. FIGS. 10 and 11 show the peak lift location of the intake and exhaust valves, respectively, at different engine load conditions. Together, they illustrate an exemplary embodiment in an engine 10 having multiple intake ports 50 per cylinder, at least one of which has an associated intake port throttle which is actuated during un-throttled SI and HCCI operation, although it will be appreciated that the method depicted in FIG. 9 can apply to many different engine configurations.

Transitioning between different modes of operation is necessary to operate an engine in a scheme such as is depicted in FIG. 9. Necessarily, different engine control settings must be switched to operate in the various modes, for example, changing exhaust and intake valve timing and lift settings as required for each of the modes. The larger the transition between the settings, the more difficult the transition is to smoothly effect while the engine is in operation. These transitions must be considered in the implementation of any of the methods described herein for a particular engine configuration.

As described above, FIG. 9 provides a scheme of operation at 3000 RPM. It will be appreciated that such schemes must be detailed for a range of possible speeds where the described gap exists. Such schemes can be stored in look-up tables based upon engine speed, reduced to a functional relationship providing outputs based upon defined inputs, or provided by any similar methods known in the art.

As described above, inclusion of an intake port throttle would allow for effectively restricting airflow through the associated intake valve 21 regardless of the valve's actuation and allows for smaller phase changes of the intake cams to effect equivalent effects. Therefore, reduced authority range cam phasing hardware 60 may be employed when coupled with intake port throttling and smaller dynamic range and slew rates of the cam phasing hardware 60 advantageously could be employed to affect an equivalent intake air control.

FIG. 10 depicts exemplary peak intake valve lift timings for three of the modes described above (HCCI combustion 713, SI combustion 717, and combined modes 715) as utilized through a range of load values, in accordance with the present disclosure. The data of FIG. 10 depicts such an exemplary embodiment employing a dual intake port/valve with one intake port throttle complement. It will be appreciated that such a dual intake valve arrangement without an intake port throttle would require a larger phase change to effect an acceptable transition to and operation within the combined HCCI (low EV and low IV lift) and stoichiometric SI operation (low EV and low IV lift) 715. Similarly, FIG. 11 depicts exemplary peak exhaust valve lift timings for the three of the modes corresponding to the data of FIG. 10 described above as utilized through the range of load values, in accordance with the present disclosure.

Referring to FIG. 10, when transitioning the exemplary engine configuration described above through the modes depicted in FIG. 9, for example, from the stoichiometric HCCI operation 713 to the combined HCCI and SI operation 715, the peak lift location of the opened intake valve needs to be changed by around 20 CAD (span 721) to reduce the airflow through the intake valve 21 sufficiently to enable un-throttled stoichiometric engine operation in the SI operated cylinders. For the transition from combined HCCI and SI operation 715 to un-throttled stoichiometric SI operation 717, the peak intake valve lift location needs to be changed by around 20 CAD (span 723).

Referring to FIG. 11, when transitioning from the stoichiometric HCCI operation 713 to the combined HCCI and SI operation 715, the peak lift location of the exhaust valve(s) 70 is changed by only a couple of CAD to reduce the internal residual level in the SI combustion cylinders enough to facilitate flame propagation (span 731). For the transition from combined HCCI and stoichiometric SI operation 715 to un-throttled stoichiometric SI operation 717 the peak exhaust valve lift location is changed by around 40 CAD (span 733).

One having ordinary skill in the art will appreciate that the above exemplary engine configuration and the resulting data of FIGS. 10 and 11 are specific to that exemplary configuration, at that engine speed, and those particular engine settings, for example, including valve lift and opening duration settings. However, it will be appreciated that the same transitions, including a combined mode utilizing a portion of cylinders utilizing one combustion mode and another portion of cylinders utilizing another combustion mode can be employed to distribute load among the cylinders favorably. If different combustion parameters are utilized, for example, a different peak valve lift and/or opening durations are used, the shown curves for the peak lift location of intake and exhaust valves will shift but the presented trends will remain.

Further, during the combined HCCI and SI operation, each cylinder is capable of running in one of a set of different combustion modes to achieve, as a sum of all of the outputs of the various cylinders, a requested engine output load. Since each of the cylinders is capable of running in any available mode, each may be run in a mode where the best performance for the mode is achieved. In the above example, any number of cylinders utilizing stoichiometric SI combustion may be offset by any number of cylinders utilizing HCCI combustion. Cylinders operating under SI operation can output a higher load, and cylinders operating under HCCI operation can output a lower load.

Different methods can be employed to distribute load among the cylinders. Distribution of the load can be based upon the magnitude of the load, for example, deviating from operation in the closest mode region as little as possible while still allowing the individual cylinders to avoid the stability and ringing problems described herein. Such operation based upon load can divide the gap according to available cylinder combinations and selectively operate in modes based upon which division of the gap the operation falls within. In another example, it can be beneficial to operate the cylinders based upon a resulting engine efficiency, for example, operating as many cylinders as possible in stoichiometric HCCI mode, and utilizing remaining cylinders to provide the remaining engine output load required. Such efficiency can be determined for a particular engine under particular conditions according to experiments, modeling, or any other method sufficient to estimate vehicle operation and resulting engine efficiency. It will also be appreciated that, as described in FIG. 2, a number of HCCI modes can be available for selection. It is possible that any of the HCCI modes may be selected and a plurality of HCCI modes may be utilized at a single time within the engine. Selection of the various HCCI modes can be accomplished, for example, balancing the force characteristics of operation in each of the modes and managing the total load across the cylinders to minimize engine vibrations. In other examples, it can be beneficial to operate cylinders in stoichiometric HCCI mode as close to the ringing limit as possible and operate cylinders in the unthrottled stoichiometric SI mode as close to the combustion stability limit as possible, thereby reducing the magnitude of load distribution among the cylinders. In another example, it can be beneficial to consider changes in combustion noise. Load can be distributed based upon a least change in combustion noise from the previous engine configuration, or a multiple step mode transition can be employed, decrease the adverse effects of the combustion noise associated with the transition. For example, if a vehicle previously operating in a stoichiometric HCCI mode in all cylinders experiences a change in load such that four cylinders are desired for operation in unthrottled stoichiometric SI mode, the cylinders can transition first to a configuration including two cylinders in unthrottled stoichiometric SI mode, provided such operation is possible, and then to the configuration including four cylinders in unthrottled stoichiometric SI mode, thereby avoiding a more harsh transition of all four cylinders at once. In another example, it can be beneficial to determine predicted requirements to be placed upon the engine in the near future, for example, determining whether engine load requirements are likely to remain stable or are likely to vary. Methods to evaluate likely driving patterns in the near future are known in the art, and examples can include analysis of GPS/3D map data, analysis of historical variations in engine load and speed, and analysis of information available to vehicle, for example, analysis of vision data detailing the present road being driven upon. Driving patterns can be used to optimally select cylinder operation ranges to allow for fewer transitions between the modes or increasing available torque to the operator without requiring additional transitions.

It will be appreciated that engine configurations require balancing of forces acting within the engine to avoid vibrations and other undesirable effects of engine operation. For example, in schemes to disable cylinders during vehicle operation, it is known to disable two corresponding cylinders at the same time to equalize forces acting upon the crankshaft. Similarly, distribution of load and selection of operating modes described herein should include methods known in the art to balance the resulting forces within the engine during operation.

It will be appreciated that the method described herein can be combined with other methods known in the art. For example, if a portion of the cylinders of an engine are deactivated to improve fuel economy and operation of the remaining cylinders results in operation within the gap described above, the distribution of load among the still-activated cylinders can be uneven according to methods described herein.

Figure 12:
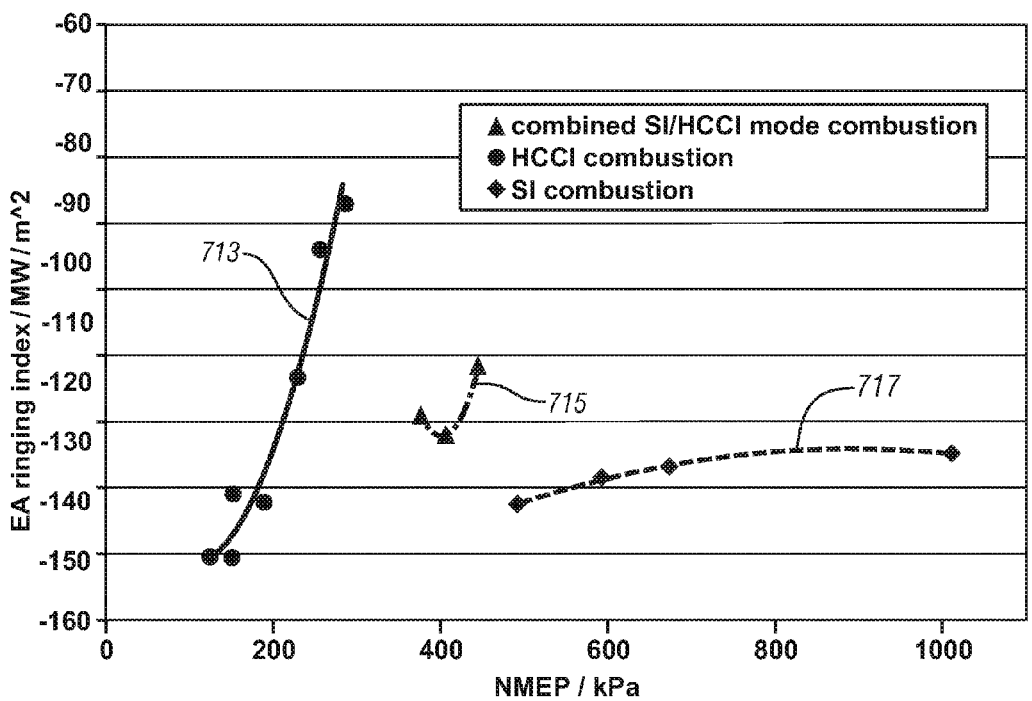
FIG. 12 is a data graph representing ringing index within various combustion modes, in accordance with the present disclosure.

FIG. 12 depicts engine averaged ringing index at different engine load conditions. The ringing index is rated in MW/m2 versus NMEP/Kpa and is depicted for each of the combustion phases, HCCI combustion 713, combined HCCI and SI combustion 715, and SI combustion 717. During HCCI combustion (low EV and low IV lift), the ringing index rises in relation to NMEP to the limitation of HCCI combustion by ringing. In one exemplary engine configuration, a ringing limit of 3 MW/m2 can be utilized. Switching from HCCI combustion to the combined HCCI and SI operation 715, a reduction of approximately 1.7 MW/m2 occurs. Further switching from the combined HCCI and SI operation 715 to the stoichiometric SI operation 715 as the load continues to increase, results in another reduction to approximately 1.1 MW/m2. Therefore, as depicted, the combined HCCI and SI operation 715 enables smooth transition between the stoichiometric HCCI mode and the unthrottled stoichiometric SI mode, maintaining ringing substantially below the observed limit.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. System for operating a direct-injection internal combustion engine having a plurality of cylinders each individually selectively operable in a homogeneous charge compression ignition mode and a spark ignition mode, the system comprising:
the engine; and
a control module:
estimating a future state of the engine including a future speed of the engine and a future load of the engine;
determining an average load per cylinder based upon the future load of the engine;
determining if the future state the engine is within an unacceptable operating region of engine speed and load whereat spark ignition mode operation produces a predetermined unacceptable level of combustion stability and homogeneous charge compression ignition mode operation produces a predetermined unacceptable level of engine ringing; and
when the future state the engine is within the unacceptable operating region of engine speed and load, controlling individual cylinders in the homogeneous charge compression ignition mode and controlling individual cylinders in the spark ignition mode to unevenly distribute load among the cylinders.

2. The system of claim 1, further comprising:
an intake valve for each of the cylinders;
an exhaust valve for each of the cylinders;
a valve actuation device for each of the intake and exhaust valves and communicatively connected to the control module for controlling lift and phasing of each exhaust valve and each intake valve; and
a fuel delivery system communicatively connected to the control module and controlling injection of fuel into each of the cylinders.

3. The system of claim 1, further comprising a single intake port per cylinder.

4. The system of claim 1, further comprising multiple intake ports per cylinder.

5. The method of claim 4, wherein at least one of the intake ports includes an intake port throttle communicatively connected to the control module.

6. The method of claim 1, wherein the engine comprises a cam phasing/valve timing mechanism to transition between the modes.

7. Method for operating a direct-injection internal combustion engine having a plurality of cylinders each individually selectively operable in a homogeneous charge compression ignition mode and a spark ignition mode, the method comprising:
estimating a future speed of the engine;
estimating a future load of the engine;
assuming even distribution of the future load among the plurality of cylinders, comparing the future speed of the engine and the future load of the engine to a spark ignition operating range to determine a resultant combustion stability;
assuming even distribution of the future load among the plurality of cylinders, comparing the future speed of the engine and the future load of the engine to a homogeneous charge compression ignition operating range to determine a resultant ringing; and
when the resultant combustion stability and the resultant ringing are determined to be unacceptable, operating a portion of the plurality of cylinders in the spark ignition mode and the remaining portion of the plurality of cylinders in the homogeneous charge compression ignition mode to unevenly distribute load of the engine among the cylinders.

8. Method for operating a direct-injection internal combustion engine having a plurality of cylinders each individually selectively operable in a homogeneous charge compression ignition mode and a spark ignition mode, the method comprising:
monitoring a speed of the engine;
monitoring a load of the engine;
determining an average load per cylinder based upon the load of the engine;
determining if engine operation based upon the engine speed and the average load per cylinder is within an operational gap between the homogeneous charge compression ignition mode and the spark ignition mode wherein both combustion modes fail threshold comparisons; and
unevenly distributing load among the plurality of cylinders by operating a portion of the plurality of cylinders in the spark ignition mode and the remaining portion of the plurality of cylinders in the homogeneous charge compression ignition mode.

9. The method of claim 8, further comprising monitoring an output torque request;
wherein monitoring the speed of the engine comprises estimating a future speed of the engine based upon the output torque request;
wherein monitoring the load of the engine comprises estimating a future load of the engine based upon the output torque request; and
wherein determining if engine operation based upon the engine speed and the average load per cylinder is within the operational gap comprises determining if the estimated future speed of the engine and the estimated future load of the engine are within the operational gap.

10. The method of claim 8, wherein each of the cylinders operate outside of the operational gap.

11. The method of claim 8, wherein operating the portion of the plurality of cylinders in the spark ignition mode and the remaining portion of the plurality of cylinders in the homogeneous charge compression ignition mode comprises transitioning one of the cylinders between homogeneous charge compression ignition mode and spark ignition mode by transitioning valves of the cylinder between low-lift exhaust and intake operation and high-lift exhaust and intake operation.

12. The method of claim 8, further comprising utilizing an intake port throttle associated with one of the cylinders to restrict airflow thereto and providing reduced phase changes for the intake cam in transitioning the cylinder between the spark ignition mode and the homogeneous charge compression ignition mode.

13. The method of claim 8, wherein unevenly distributing load among the plurality of cylinders is accomplished by operating each cylinder on load thresholds of the operational gap.

14. The method of claim 8, wherein unevenly distributing load among the plurality of cylinders is determined by determining the most energy efficient way to unevenly distribute load.

15. The method of claim 8, wherein unevenly distributing load among the plurality of cylinders is determined by minimizing changes in combustion noise.

16. The method of claim 8, wherein unevenly distributing load among the plurality of cylinders is determined from a predicted load upon the engine.

17. The method of claim 8, wherein unevenly distributing load among the plurality of cylinders is determined by balancing resulting forces within the engine.

18. The method of claim 8, wherein the engine is selectively operable in a plurality of homogeneous charge compression ignition modes; and wherein unevenly distributing load among the plurality of cylinders comprises operating the remaining portion of the plurality of cylinders in one of the homogeneous charge compression ignition modes.

19. The method of claim 8, wherein the engine is selectively operable in a plurality of homogeneous charge compression ignition modes; and wherein unevenly distributing load among the plurality of cylinders comprises operating the remaining portion of the plurality of cylinders in at least two of the a plurality of the homogeneous charge compression ignition modes.

* * * * *